US012717601B2

(12) United States Patent
Tsirkin et al.

(10) Patent No.: US 12,717,601 B2
(45) Date of Patent: Aug. 25, 2026

(54) VIRTUAL DEVICE TRANSLATION FOR NESTED VIRTUAL MACHINES

(71) Applicant: RED HAT, INC., Raleigh, NC (US)

(72) Inventors: Michael Tsirkin, Lexington, MA (US); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 1077 days.

(21) Appl. No.: 17/550,775

(22) Filed: Dec. 14, 2021

(65) Prior Publication Data

US 2023/0185593 A1 Jun. 15, 2023

(51) Int. Cl.
*G06F 9/455* (2018.01)

(52) U.S. Cl.
CPC .................... *G06F 9/45558* (2013.01); *G06F 2009/45566* (2013.01); *G06F 2009/45579* (2013.01); *G06F 2009/45583* (2013.01)

(58) Field of Classification Search
CPC ....... G06F 9/45558; G06F 2009/45566; G06F 2009/45579; G06F 2009/45583
See application file for complete search history.

(56) References Cited

U.S. PATENT DOCUMENTS

| | | | | |
|---|---|---|---|---|
| 10,296,465 | B2 | 5/2019 | John et al. | |
| 10,467,033 | B2 | 11/2019 | Tian et al. | |
| 10,963,281 | B2 | 3/2021 | Wang et al. | |
| 11,003,485 | B2 | 5/2021 | Hu et al. | |
| 2019/0171565 | A1* | 6/2019 | Bowen-Huggett | G06F 12/06 |
| 2020/0073691 | A1* | 3/2020 | Tsirkin | H04L 63/105 |
| 2020/0110629 | A1* | 4/2020 | Hu | G06F 9/45558 |
| 2020/0242264 | A1* | 7/2020 | Hajnoczi | G06F 12/1009 |
| 2021/0318900 | A1* | 10/2021 | Gopalan | G06F 9/45558 |

OTHER PUBLICATIONS

Lim et al. ("Optimizing Nested Virtualization Performance Using Direct Virtual Hardware", ASPLOS '20, Mar. 16-20, 2020) (Year: 2020).*

Jayneel Gandhi et al., "Efficient Memory Virtualization-Reducing Dimensionality of Nested Page Walk", http://pages.cs.wisc.edu/~swift/papers/micro14-virtualization.pdf, 2014, Department of Computer Sciences University of Wisconsin, Madison, USA, AMD Research, Advanced Micro Devices, Inc., USA.

(Continued)

*Primary Examiner* — Lewis A Bullock, Jr.
*Assistant Examiner* — Kevin X Lu
(74) *Attorney, Agent, or Firm* — Womble Bond Dickinson (US) LLP

(57) ABSTRACT

Systems and methods for memory management for nested virtual machines. An example method may comprise running, by a host computer system, a hypervisor managing a first virtual machine; responsive to receiving, by the hypervisor, a request to create a second virtual machine nested within the first virtual machine, determining whether the second virtual machine will be using a physical address as a virtual address for a peripheral device; and responsive to determining that the second virtual machine will be using the physical address as the virtual address for the peripheral device, initializing a first data structure for address translation of the physical addresses of the second virtual machine corresponding to virtual addresses of the peripheral device to a host virtual addresses.

20 Claims, 6 Drawing Sheets

(56) References Cited

OTHER PUBLICATIONS

Jin Tack Lim, "Optimizing Nested Virtualization Performance Using Direct Virtual Hardware", https://www.cs.columbia.edu/~nieh/pubs/asplos2020_dvh.pdf, Mar. 16-20, 2020, Columbia University.
"Nested Virtualization", https://docs.microsoft.com/en-us/virtualization/hyper-v-on-windows/tlfs/nested-virtualization, Oct. 15, 2020.

* cited by examiner

Run, by a host computer system, a hypervisor managing a first virtual machine. 310

Responsive to receiving, by the hypervisor, a request to create a second virtual machine nested within the first virtual machine, determine whether the second virtual machine is requesting to use a physical address as a virtual address for a peripheral device. 320

Responsive to determining that the second virtual machine requested to use the physical address as the virtual address for the peripheral device, initialize a first data structure for address translation of the physical addresses of the second virtual machine corresponding to virtual addresses of the peripheral device to a host virtual addresses. 330

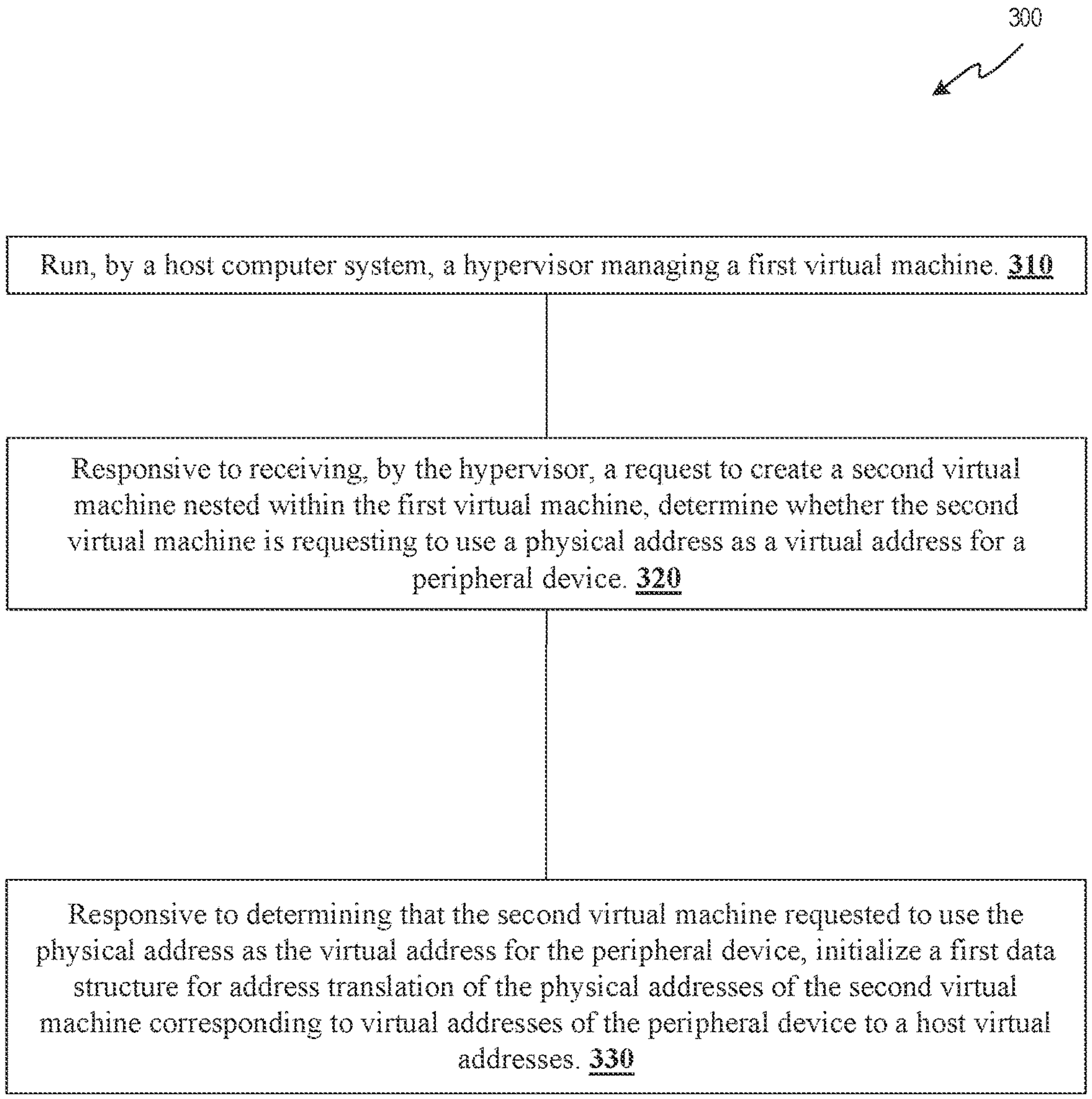

Run, by a host computer system, a hypervisor managing a first virtual machine. 510

Responsive to receiving, by the hypervisor, a request to create a second virtual machine nested within the first virtual machine, initialize a first data structure for address translation of physical addresses of the second virtual machine corresponding to virtual addresses of a peripheral device. 520

Receive an identity of the peripheral device associated with the second virtual machine and at least one guest memory address allocated to the second virtual machine. 530

Receive, by the peripheral device, a request from the second virtual machine. 540

Determine whether a physical address referenced by the request corresponds to a virtual address of the peripheral device. 550

Responsive to determining that the physical address referenced by the request corresponds to the virtual address of the peripheral device, determine, based on the at least one guest memory address associated with the physical address referenced by the request, a host virtual address corresponding to the physical address of the second virtual machine. 560

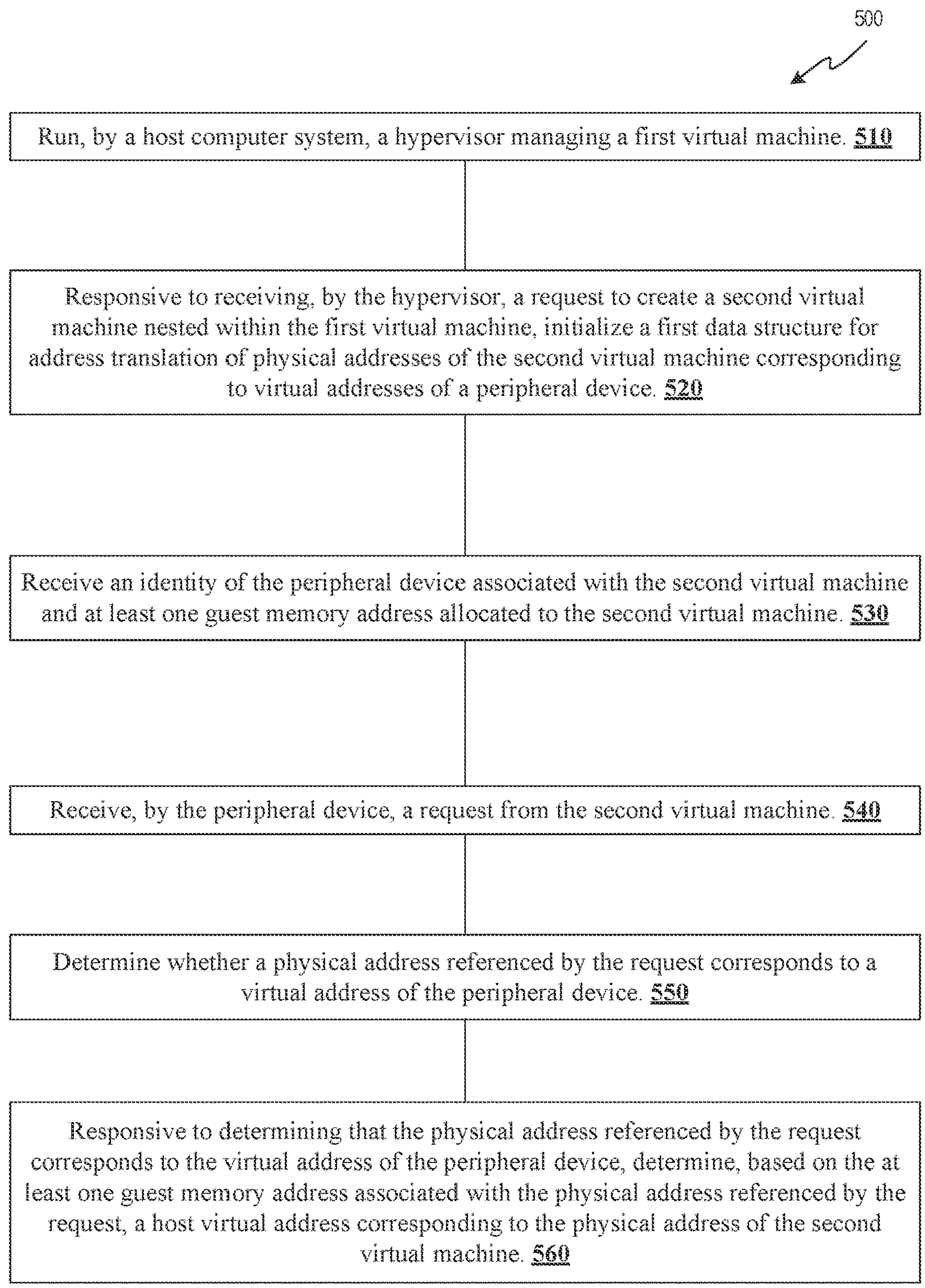

FIG. 5

VIRTUAL DEVICE TRANSLATION FOR NESTED VIRTUAL MACHINES

TECHNICAL FIELD

The present disclosure is generally related to virtualized computer systems, and more particularly, to improving virtual device translation for nested virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts a flow diagram of an example method of virtual device translation for accessing a virtual device by nested virtual machines, in accordance with one or more aspects of the present disclosure;

FIG. 5 depicts a block diagram illustrating components and modules of an example computer system, in accordance with one or more aspects of the present disclosure;

DETAILED DESCRIPTION

Figure 1:
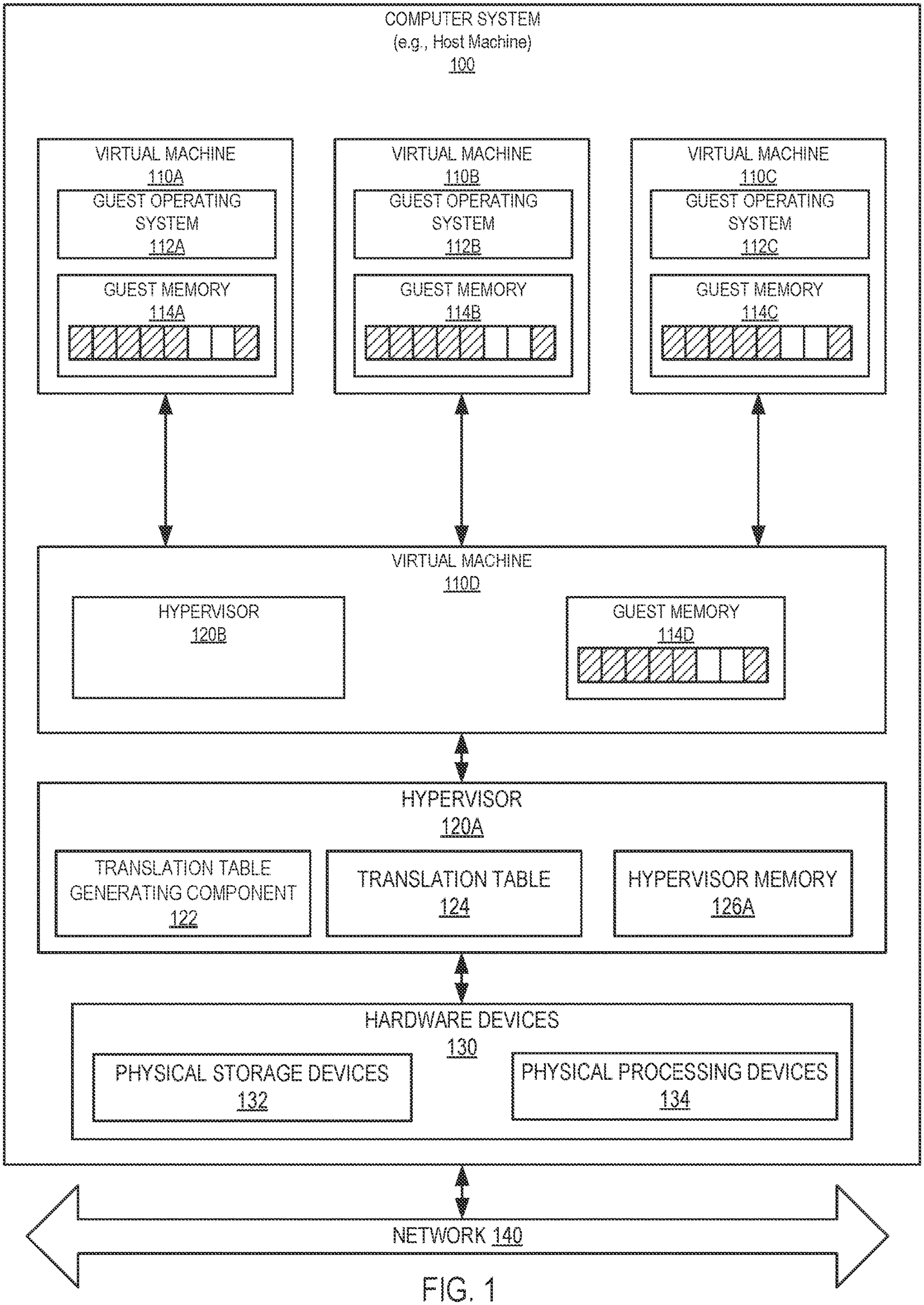
FIG. 1 depicts a high-level block diagram of an example host computer system that performs memory translation for accessing a virtual device by nested virtual machines, in accordance with one or more aspects of the present disclosure.

Described herein are systems and methods for improving virtual device translation for nested virtual machines.

An input/output memory management unit (IOMMU) is a hardware device that resides on the input/output (I/O) path connecting a peripheral device to the memory. The IOMMU may map the device address space (e.g., a bus address) that is relevant to the I/O bus into the physical address space (e.g., host physical address) that is relevant to the memory bus. The IOMMU may include an IOMMU page table, which includes a set of page table entries, such that each page table entry translates a device-visible memory address to a host physical address of the host memory. The IOMMU may also include extra information associated with the address space mapping such as read and write permissions.

Nested virtualization refers to virtualization that runs inside an already virtualized environment. In nested virtualization, a first hypervisor (hereafter "Level 0 hypervisor") controls physical hardware resources (e.g., bare metal). One or more second hypervisors (hereafter "Level 1 hypervisor") may run as virtual machine(s) managed by the Level 0 hypervisor. Each Level 1 hypervisor may run its own set of VMs. These VMs can be referred to as Level 2 VMs. Each level corresponds to a level of privilege and access to computing resources of a computer system, where Level 0 indicates a most privileged level within an architecture of the computer system, and incremental levels indicate less privileged rings (e.g., Level 2 is less privileged that Level 1). The Level 1 hypervisor may control execution of the Level 2 VM(s). For example, the Level 1 hypervisor may implement a firewall in software and prevent the Level 2 VM from communicating outside the Level 1 hypervisor.

In some instances, a Peripheral Component Interconnect (PCI) device may be assigned to a nested guest (e.g., Level 2 VM). In some instances, the PCI device may be connected to a physical bus of the host machine. In some instances, the hypervisor may abstract the PCI device by assigning particular port ranges of the PCI device to the VM and presenting the assigned port ranges to the VM as a virtual device. The PCI device may be capable of direct memory access (DMA). DMA allows the PCI device to access the system memory for reading and/or writing independently of the central processing unit (CPU). PCI devices that are capable of performing DMA include disk drive controllers, graphics cards, network interface cards (NICs), sound cards, or any other input/output (I/O) device. While the hardware device is performing the DMA, the CPU can engage in other operations.

In nested virtualization, a virtual device may be created and implemented by a nested hypervisor (e.g., the Level 1 hypervisor, a Level 2 hypervisor, etc.) and exposed to a VM (e.g., a Level 2 VM, a Level 3 VM running on a Level 2 hypervisor, etc.) as a pass-through device. In current technologies, when a nested VM requests access to a virtual device implemented by a nested hypervisor, the access request first requires a VMexit to the Level 0 hypervisor, whereby the Level 0 hypervisor communicates with every level of the nested virtualized environment to translate the access request. This process uses additional processing resources (e.g., central processing unit (CPU) resources) and hinders performance.

Aspects of the present disclosure address the above and other deficiencies by providing technology that improves virtual device translation for nested virtual machines. In particular, directly mapping guest memory address exposed to Level 2 VM, by Level 1 VM a physical address, to addresses of the host virtual memory of the Level 0 hypervisor memory for peripheral devices. In an illustrative example, a host computer system can run a Level 0 hypervisor managing a Level 1 virtual machine running a Level 1 hypervisor. The Level 1 hypervisor may manage a Level 2 VM. The Level 0 hypervisor may maintain a host page table storing mappings of guest physical addresses of the Level 2 virtual machine used as guest virtual addresses for a physical device (e.g., PCI device) to host virtual addresses of the Level 0 hypervisor. When Level 2 VM is created, the Level 0 hypervisor receives a notification that the guest physical addresses of the Level 2 virtual machine will be used as a guest virtual address for the physical device (e.g., PCI device) and generates the mapping in the host page table. In response to a request to access the physical device, the Level 0 hypervisor translates the guest physical addresses of the Level 2 virtual machine to a host virtual address of the Level 0 hypervisor to access the physical device, thereby speeding up memory translation for accessing physical devices and enhancing the performance of the computer system.

Various aspects of the above referenced methods and systems are described in details herein below by way of examples, rather than by way of limitation. The examples provided below discuss a virtualized computer system where memory management may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-D, hypervisors 120A-B, hardware devices 130, and a network 140.

Virtual machines 110A-D may execute guest executable code that uses an underlying emulation of the physical resources. The guest executable code may include a guest operating system, guest applications, guest device drivers, etc. Each of the virtual machines 110A-D may support hardware emulation, full virtualization, para-virtualization, operating system-level virtualization, or a combination thereof. Virtual machines 110A-D may have the same or different types of guest operating systems, such as Microsoft®, Windows®, Linux®, Solaris®, etc. Virtual machines 110A-C may execute guest operating systems 112A-C that manage guest memory 114A-C respectively. Virtual machine 110D may also execute a guest operating system that manages guest memory. Virtual machine 110D be the same or similar in all aspects to virtual machines 110A-C.

Guest memory 114A-C may be any virtual memory, logical memory, physical memory, other portion of memory, or a combination thereof for storing, organizing, or accessing data. Guest memory 114A-C may represent the portion of memory that is designated by hypervisors 120A-B for use by one or more respective virtual machines 110A-C. Guest memory 114A-C may be managed by guest operating system 112A-C and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126A (e.g., host memory) and guest memory 114D (e.g., hypervisor memory of virtual machine 110D) may be the same or similar to the guest memory but may be managed by hypervisor 120A-B, respectively, instead of a guest operating system. Hypervisor memory 126A may be segmented into host pages, and guest memory 114D may be segmented into guest pages, which may be in different states. The states may correspond to unallocated memory, memory allocated to guests, and memory allocated to hypervisor(s). The unallocated memory may be host memory pages and guest memory pages that have not yet been allocated by hypervisor memory 126A-B or were previously allocated by hypervisor 120A-B and have since been deallocated (e.g., freed) by hypervisor 120A-B. The memory allocated to guests may be a portion of hypervisor memory 126A that has been allocated by hypervisor 120A to virtual machine 110D and corresponds to guest memory 114D, and to guest memory of hypervisor 120B, which is running on virtual machine 110D. Hypervisor 120B may allocate a portion of guest memory 114D to virtual machines 110A-C, which corresponds to guest memory 114A-C. Other portions of hypervisor memory may be allocated for use by hypervisor 120A-B, a host operating system, hardware device, other module, or a combination thereof.

Hypervisor 120A may also be known as a virtual machine monitor (VMM) and may provide hypervisor 120B and virtual machines 110A-D with access to one or more features of the underlying hardware devices 130. Hypervisor 120A may be a Level 0 hypervisor, thus having the highest level of privilege within the computer system 100. In the example shown, hypervisor 120A may run directly on the hardware of computer system 100 (e.g., bare metal hypervisor). In other examples, hypervisor 120A may run on or within a host operating system (not shown). Hypervisor 120A may manage system resources, including access to hardware devices 130. In the example shown, hypervisor 120A may include translation table generating component 122 used to generate and store a translation table 124 in host memory.

The translation table generating component 122 may generate translation table 124. A translation table (e.g., a page table) is a data structure used by a hypervisor to store a mapping of addresses of guest memory to addresses of hypervisor memory. In an example, hypervisor 120B of virtual machine 110D may request hypervisor 120A to create a nested VM (e.g., virtual machines 110A-C) to be managed by virtual machine 110D. When creating the nested VM, for example, virtual machines 110A, the hypervisor 120A may receive a notification from hypervisor 120B indicating that the virtual machine 110A will be using the guest physical address of the guest memory 114A as a guest virtual address for a physical hardware device (e.g., a Peripheral Component Interconnect (PCI) device, a network device, etc.). In some embodiments, the hypervisor 120A receives the notification from the virtual machine 110D managing the virtual machine 110A. In another embodiment, the notification may be based on the presence of a virtual input/output memory management unit (IOMMU) in the virtual machine 110A. In yet another embodiment, the notification may be based on the configuration of the virtual IOMMU by the virtual machine 110A. In response to the notification, the hypervisor 120A receives from the hypervisor 120A an identification of the physical hardware device to be assigned the virtual machine 110A. Additionally, the hypervisor 120A receives a list of guest memory addresses (e.g., guest memory 114D) exposed to virtual machine 114A. The each guest memory address 114D exposed to virtual machine 114A includes a guest physical address associated with the virtual machine 114D and a guest physical address associated with the virtual machine 114A. The hypervisor 120A maps the guest physical address of virtual machine 114A associated with the virtual machine 114D to a host virtual address. To create the mapping of the guest physical address of virtual machine 114A to the host virtual address, the hypervisor 120A translates the guest physical address of virtual machine 114A to the guest physical address of virtual machine 114D. Level 1 hypervisor (e.g., hypervisor 120B) may manage a guest page table and use the guest page table to store a mapping of addresses of the guest physical memory (e.g., guest physical addresses) of the Level 2 virtual machine (e.g., virtual machine 114A) memory to the addresses of the guest physical memory (e.g., guest physical addresses) of the Level 1 hypervisor (e.g., hypervisor 120B) memory. The Level 1 hypervisor (e.g., hypervisor 120B) may send (e.g., expose) the guest page table to the Level 0 hypervisor (e.g., hypervisor 120A). Accordingly, the guest physical address of virtual machine 114A may be translated to the corresponding guest physical address of virtual machine 114D using the guest page table that is managed by the hypervisor 120B and exposed to hypervisor 120A.

Once the guest physical address of virtual machine 114D is obtained, the hypervisor 120A translates the guest physical address of virtual machine 114D to a host physical address. The mappings of guest physical addresses to corresponding host physical addresses may be stored in a memory data structure, such as an extended page table (EPT). Accordingly, the guest physical address of virtual machine 114D may be translated to the corresponding host physical address using the EPT that is managed by the hypervisor 120A. The hypervisor 120A, based on the host physical address associated with the guest physical address of virtual machine 114D, determines an offset of the host physical address. In particular, host physical address spaces of a memory buffer (e.g., a physical memory storage) and host virtual address spaces of the memory buffer are allocated by the hypervisor. Accordingly, each of the host physical address spaces and the host virtual address spaces contain a starting address on the memory buffer. An offset is determined based on the difference between the starting address on the memory buffer associated with the host physical address space and the starting address on the memory buffer associated with the host virtual address. The hypervisor 120A determines the host virtual address associated with the guest physical address of virtual machine 114A by adding the determined offset to the guest physical address of virtual machine 114A. Accordingly, responsive to an access request, by virtual machine 110A, to the physical device, hypervisor 120A may then look up the host virtual address in the translation table 124 by using the guest physical address of guest memory 114A to process the access request.

The translation table 124 may be generated during an initialization of the virtual machine(s) 110A-C by hypervisor 120A, or during any other event. The translation table 124 may be visible to hypervisors at all levels (e.g., Level 0 hypervisor, Level 1 hypervisor(s), Level 2 hypervisor(s), etc.) For example, the translation table 124 may be stored in a model-specific register (MSR) of a CPU.

Hypervisor 120B may also be known as a virtual machine monitor (VMM) and may provide virtual machines 110A-C with access to one or more features of the underlying hardware devices 130. Hypervisor 120B may be a level 1 (Level 1) hypervisor, thus having a lower privilege than hypervisor 120A. In the example shown, hypervisor 120B may run on or within a virtual machine 110D running on hypervisor 120A. Hypervisor 120B may manage system resources provided to hypervisor 120B by virtual machine 110D or by hypervisor 120A.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
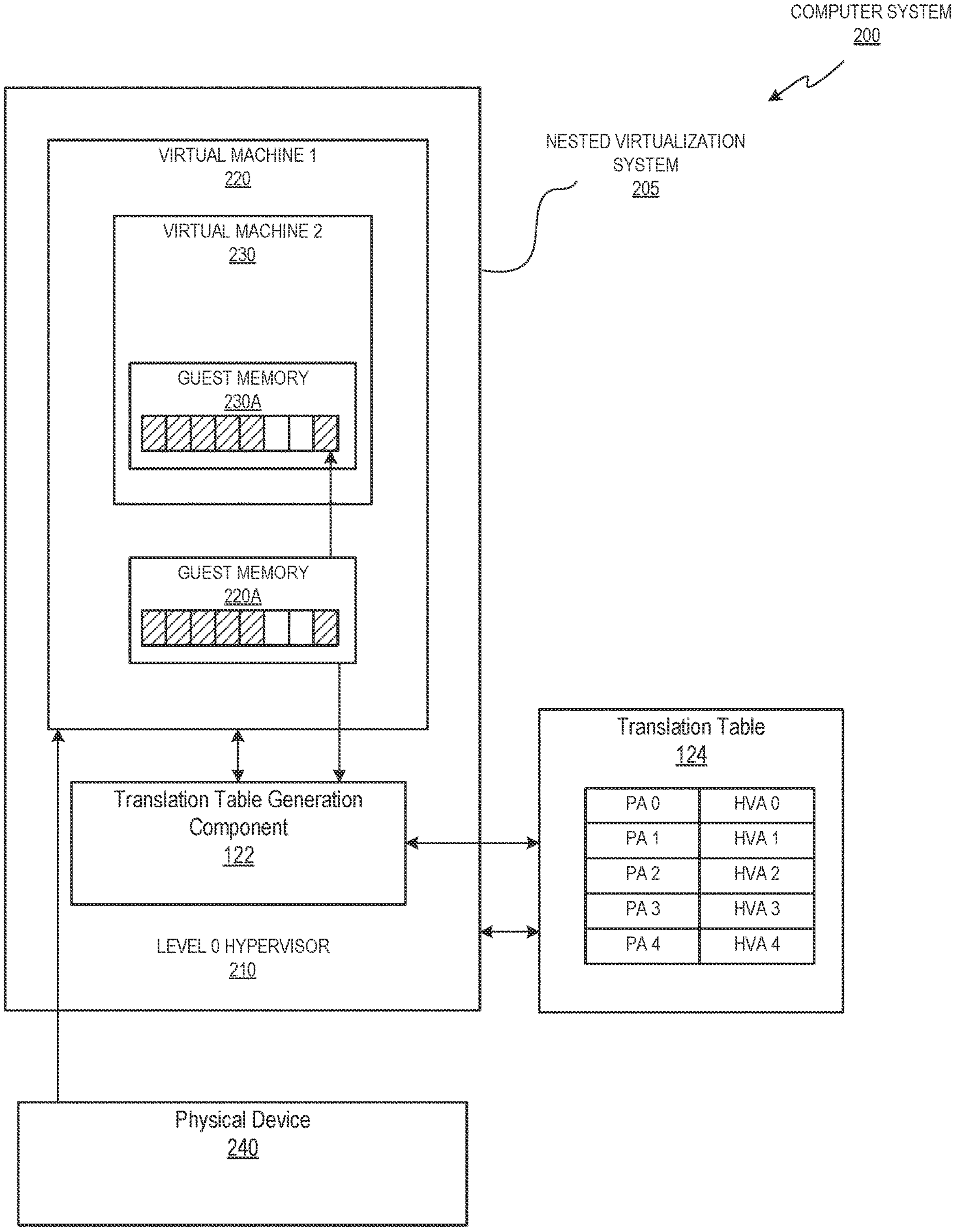
FIG. 2 depicts a block diagram illustrating an example memory translation, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include hypervisor 210, virtual machines 220 and 230, guest memory 220A and 230A, and physical device 240.

Nested virtualization system 205 may include a virtual machine 220 (Level 1 VM) implemented with guest memory 220A (e.g., host memory of the hypervisor) and virtual physical device (e.g., resources of a physical device 240) provided by hypervisor 210. In some instances, all of the resources of the bare metal may be provided to hypervisor 210, or a subset of the bare metal resources may be provided to hypervisor 210.

Nested virtualization system 205 may run virtual machine 230 (e.g., Level 2 VM) in virtual machine 220 (e.g., Level 1 VM). Virtual machine 220 may request hypervisor 210 to create a nested virtual machine 230 of virtual machine 220. Hypervisor 210, responsive to the received request, creates nested virtual machine 230 within virtual machine 220 and provides, to the newly created nested virtual machine 230, guest memory 230A. Guest memory 230A refers to a portion of guest memory 220A that has been exposed to the nested virtual machine 230. In addition to the request to create the nested virtual machine 230, the virtual machine 220 may notify the hypervisor 210 that the nested virtual machine 230 will be using the physical address of the guest memory 230A as the virtual address of the physical device 240. Accordingly, virtual machine 220 provides the hypervisor 210 the guest memory 220A that was exposed to the nested virtual machine 230 as well an identification of the physical device 240 to be exposed to the nest virtual machine 230 (e.g., metadata associated with identity of the physical address to exposed).

Upon receiving notification that the nested virtual machine 230 will be using the physical address of the guest memory 230A as the virtual address of the physical device 240, the hypervisor 210 provides the translation table generation component 122 a list of guest memory 220A that was exposed to the nested virtual machine 230 and the identification of the physical device 240. In an embodiment, hypervisor 210 may be notified by virtual machine 220 that the nested virtual machine 230 will be using the physical address of the guest memory 230A as the virtual address of the physical device 240. Depending on the embodiment, the notification may be based on the presence of a virtual input/output memory management unit (IOMMU) in the nested virtual machine 230 or the configuration of the virtual IOMMU by the nested virtual machine 230.

Each of the guest memory 220A of the list of guest memory 220A provided to the translation table generation component 122 includes a guest physical address of the guest memory 220A and a guest physical address of the guest memory 230A corresponding to the guest physical address of the guest memory 220A. To generate a translation table 124, the translation table generation component 122 maps each guest physical address of the guest memory 230A (e.g., PA 0-4) associated with the physical device to a host virtual address associated with the physical device (e.g., HVA 0-4).

To map each guest physical address of the guest memory 230A (e.g., PA 0-4) associated with the physical device to a host virtual address associated with the physical device (e.g., HVA 0-4), the translation table generation component 122 translates the guest physical address of the guest memory 230A to a guest physical address of the guest memory 220A. As previously described, the guest physical address of the guest memory 230A may be translated to the corresponding guest physical address of the guest memory 220A using a guest page table that is managed by a hypervisor of virtual machine 220 and exposed to Level 0 hypervisor 210.

After obtaining the guest physical address of the guest memory 220A corresponding to the guest physical address of the guest memory 230A, the translation table generation component 122 translates the guest physical address of the guest memory 220A corresponding to the guest physical address of the guest memory 230A to a host physical address. As previously described, mappings of guest physical addresses of guest memory 220A to corresponding host physical addresses are maintained and stored in a memory data structure, such as an extended page table (EPT) by Level 0 hypervisor 220. Accordingly, the guest physical address of the guest memory 230A may be translated to the corresponding host physical address using the EPT that is managed by the Level 0 hypervisor 220.

Based on the host physical address, the translation table generation component 122 determines an offset associated with the host physical address. As described previously, host physical address spaces of a memory buffer (e.g., a physical memory storage) and host virtual address spaces of the memory buffer are allocated by the hypervisor. Thus, each of the host physical address spaces and the host virtual address spaces contain a starting address on the memory buffer. The offset is determined based on the difference between the starting address on the memory buffer associated with the host physical address space and the starting address on the memory buffer associated with the host virtual address. The offset may be a specific memory size that covers the virtual addresses used by hypervisor 210. For example, the offset may be selected to avoid overlapping with virtual addresses used by hypervisor 210, such as addresses up to 512 Mbytes. Thus, the offset, for example, will be 512 Mbytes to avoid the addresses up to 512 Mbytes used by the hypervisor 210. Based on the determined offset, translation table generation component 122 adds the offset to the physical address of the guest physical address of the guest memory 230A to obtain a host virtual address (e.g. HVA 0-4) associated with the guest physical address of the guest memory 230A. Accordingly, the translation table generation component 122 stores in the translation table 124 the guest physical address of the guest memory 230A (e.g., PA 0-4) and the corresponding host virtual address (e.g., HVA 0-4).

In response to a request to access the physical device 240, the hypervisor 210 receives the physical address of the guest memory 230A (e.g., PA 3) used as a virtual address for the physical device 240 from the virtual machine 220. The hypervisor 210 translates the physical address of the guest memory 230A (e.g., PA 3), via the translation table 124, to a host virtual address (e.g., HVA 3) to access to physical device 240. In response to a request containing an arbitrary guest virtual address (e.g., not a physical address used as a virtual address), the translation is handled by a mapping table of the virtual machine 220 and hypervisor 210. For example, workloads that utilize virtual addresses for specified purposes.

FIG. 3 depicts a flow diagram of one illustrative example of a method 300 for virtual device translation for accessing a virtual device by nested virtual machines, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 310. At block 310, the processing device runs, by a host computer system, a hypervisor managing a first virtual machine.

At block 320, responsive to receiving, by the hypervisor, a request to create a second virtual machine nested within the first virtual machine, the processing device determines whether the second virtual machine will be using a physical address as a virtual address for a peripheral device. As described previously, the first virtual machine sends a request to the hypervisor to create the second virtual machine (e.g., a nested virtual machine) which creates the second virtual machine within the first machine. The first virtual machine provides the second virtual machine guest memory (e.g., a portion of guest memory from the first virtual machine). The first virtual machine while sending the request sends a notification to the hypervisor to inform the hypervisor that the second virtual machine will be using the exposed guest memory (e.g., physical address of the second virtual machine) as a virtual address for accessing the peripheral device (e.g., a physical device). The peripheral device may be, for example, a network interface controller. As described previously, the hypervisor may be notified by first virtual machine that the second virtual machine will be using the physical address as the virtual address for the peripheral device. Depending on the embodiment, the notification may be based on the presence of a virtual input/output memory management unit (IOMMU) in the second virtual machine or the configuration of the virtual IOMMU by the second virtual machine.

At block 330, responsive to determining that the second virtual machine will be using the physical address as the virtual address for the peripheral device, the processing device initializes a first data structure for address translation of the physical addresses of the second virtual machine corresponding to virtual addresses of the peripheral device to a host virtual addresses. The first data structure (e.g., translation table) stores mapping between the physical addresses of the second virtual machine associated with virtual addresses corresponding to the peripheral device to host virtual addresses.

To initialize the first data structure for address translation of the physical addresses of the second virtual machine corresponding to virtual addresses of the peripheral device to the host virtual addresses, the processing device receives an identity of the peripheral device associated with the second virtual machine and at least one guest memory address allocated to the second virtual machine. Each guest memory address of the at least one guest memory address allocated to the second virtual machine corresponds to a physical address of the first virtual machine and a physical address of the second virtual machine. As described previously, each guest memory address includes a guest physical address of the first virtual machine and a guest physical address of the second virtual machine based on the allocation (e.g., exposure) of the guest memory addresses from the first virtual machine to the second virtual machine. As previously described, the guest physical address of the second virtual machine may be translated to the corresponding guest physical address of the first virtual machine using a guest page table that is managed by the hypervisor of the first virtual machine and exposed to the hypervisor.

Accordingly, the processing device obtains a physical address of the first virtual machine associated with the physical address of the second virtual machine.

Based on physical address of the first virtual machine is obtained, the processing device determines a host physical address. As previously described, mappings of guest physical addresses of the first virtual machine to corresponding host physical addresses may be stored in a memory data structure, such as an extended page table (EPT). Accordingly, the guest physical address of the first virtual machine may be translated to the corresponding host physical address using the EPT that is managed by the hypervisor. As described previously, depending on the embodiment, the hypervisor may contain additional mapping tables to translate the physical address of the first virtual machine to the host physical address. Once, the host physical address is obtained, the processing device determines an offset associated with the determined host physical address. As described previously, host physical address spaces of a memory buffer (e.g., a physical memory storage) and host virtual address spaces of the memory buffer are allocated by the hypervisor. Thus, each of the host physical address spaces and the host virtual address spaces contain a starting address on the memory buffer. The offset is determined based on the difference between the starting address on the memory buffer associated with the host physical address space and the starting address on the memory buffer associated with the host virtual address. The offset may be a specific memory size that covers the virtual addresses used by hypervisor 210. For example, the offset may be selected to avoid overlapping with virtual addresses used by hypervisor 210, such as addresses up to 512 Mbytes. Thus, the offset, for example, will be 512 Mbytes to avoid the addresses up to 512 Mbytes used by the hypervisor 210. Accordingly, when the offset is added to a physical address of the first or second virtual machine, the location of the physical address of the first or second virtual machine will not overlap with the physical address being used by the hypervisor.

The processing device, based on the determined offset and the physical address of the second virtual machine, determines the host virtual address associated with the physical address of the second virtual machine. To determine the host virtual address associated with the physical address of the second virtual machine, the processing device adds the determined offset to the physical address of the second virtual machine to determine the host virtual address associated with the physical address of the second virtual machine. Accordingly, both the physical address of the second virtual machine and the host virtual address associated with the physical address of the second virtual machine are stored in the first data structure (e.g., translation table).

In some embodiments, the processing device receives, by the peripheral device, a request from the second virtual machine. Responsive to receiving, by the peripheral device, a request from the second virtual machine, the processing device determines whether a physical address referenced by the request corresponds to the virtual address of the peripheral device. Responsive to determining that the physical address referenced by the request corresponds to the virtual address of the peripheral device, the processing device accesses the first data structure for address translation of the physical address referenced by the request to a host virtual address. Accordingly, based on the results of the address translation of the physical address referenced by the request to the host virtual address, the processing device accesses the peripheral device by the second virtual machine. As described previously, the request from the second virtual machine is first received by the first virtual machine to determine access privileges, for example, validation and execution of the request.

Responsive to completing the operations described herein above with references to block 350, the method may terminate.

Figure 4:
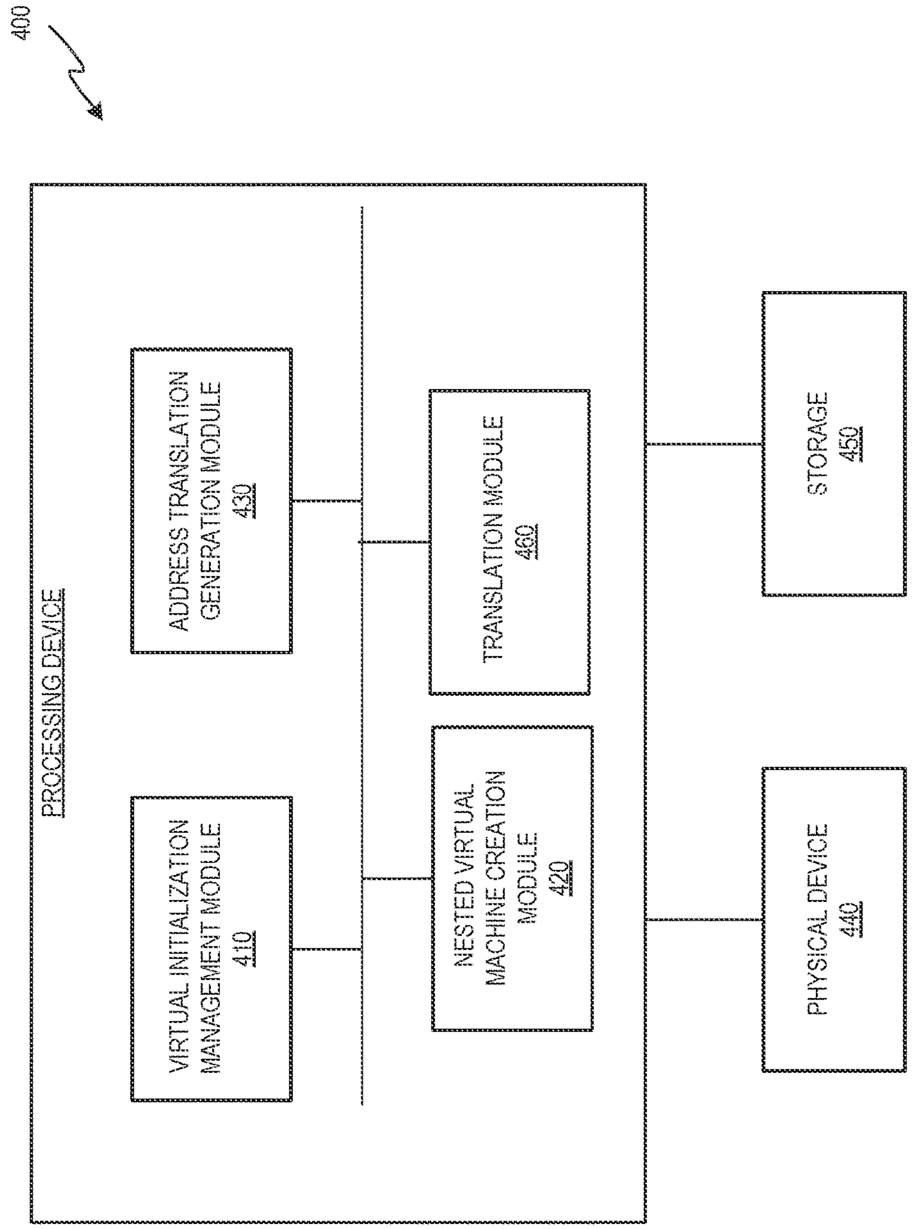
FIG. 4 depicts a flow diagram of an example method of virtual device translation for accessing a virtual device by nested virtual machines, in accordance with one or more aspects of the present disclosure.

FIG. 4 depicts a block diagram of a computer system 400 operating in accordance with one or more aspects of the present disclosure. Computer system 400 may be the same or similar to computing device 100 of FIG. 1 or computing device 200 of FIG. 2, and may include one or more processors and one or more memory devices. In the example shown, computer system 400 may include a virtualization initialization module 410, a nested virtual machine creation module 420, address translation generation module 430, physical device 440, storage 450, and a translation module 460.

Virtualization initialization module 410 may enable the processing device (e.g., processor) to run a hypervisor managing a first virtual machine with guest memory provided by the hypervisor.

Nested virtual machine creation module 420 may enable the processor to create a second virtual machine. The processor nests the second virtual machine within the first virtual machine. As described previously, to initiate the nested virtual machine creation module 420, the first virtual machine sends a request to the hypervisor to create a nested virtual machine (e.g., second virtual machine). Based on the request, the nested virtual machine creation module 420 creates a second virtual machine to be nested within the first virtual machine. During creation of the second virtual machine to be nested within the first virtual machine, the nested virtual machine creation module 420 assigns the peripheral device to the second virtual machine and exposes at least one guest memory address from the first virtual machine to the second virtual machine. In addition to receiving the request by the hypervisor to create the second virtual machine, a notification is received indicating that the second virtual machine will be using a physical address as a virtual address for a peripheral device. As described previously, depending on the embodiment, the notification may be based on the presence of a virtual input/output memory management unit (IOMMU) in the second virtual machine or the configuration of the virtual IOMMU by the second virtual machine. The notification triggers the address translation generation module 430.

Address translation generation module 430 initializes a translation table, stored in storage 450, for address translation of the physical addresses of the second virtual machine corresponding to virtual addresses of the peripheral device to a host virtual addresses. The address translation generation module 430 receives from the nested virtual machine creation module 420 an identity of the peripheral device assigned (e.g., associated) with the second virtual machine and the at least one guest memory address allocated (e.g., exposed) to the second virtual machine. As described previously, each guest memory address of the at least one guest memory address allocated to the second virtual machine corresponds to a physical address of the first virtual machine and a physical address of the second virtual machine. Thus, each guest memory address received by the address translation generation module 430 includes a guest physical address of the first virtual machine and a guest physical address of the second virtual machine based on the allocation (e.g., exposure) of the guest memory addresses from the first virtual machine to the second virtual machine.

The address translation generation module 430 translates the guest physical address of the second virtual machine to the guest physical address of the first virtual machine. As previously described, the guest physical address of the second virtual machine may be translated to the corresponding guest physical address of the first virtual machine using a guest page table that is managed by the hypervisor of the first virtual machine and exposed to the hypervisor. Based on the first guest physical address, the address translation generation module 430 translates the guest physical address of the first virtual machine into a host physical address. As previously described, mappings of guest physical addresses of the first virtual machine to corresponding host physical addresses may be stored in a memory data structure, such as an extended page table (EPT). Accordingly, the guest physical address of the first virtual machine may be translated to the corresponding host physical address using the EPT that is managed by the hypervisor. Once the host physical address is determined, the address translation generation module 430 determines an offset associated with the determined host physical address. As described previously, host physical address spaces of a memory buffer (e.g., a physical memory storage) and host virtual address spaces of the memory buffer are allocated by the hypervisor. Thus, each of the host physical address spaces and the host virtual address spaces contain a starting address on the memory buffer. The offset is determined based on the difference between the starting address on the memory buffer associated with the host physical address space and the starting address on the memory buffer associated with the host virtual address. The offset may be a specific memory size that covers the virtual addresses used by hypervisor 210. For example, the offset may be selected to avoid overlapping with virtual addresses used by hypervisor 210, such as addresses up to 512 Mbytes. Thus, the offset, for example, will be 512 Mbytes to avoid the addresses up to 512 Mbytes used by the hypervisor 210. Accordingly, when the offset is added to a physical address of the first or second virtual machine, the location of the physical address of the first or second virtual machine will not overlap with the physical address being used by the hypervisor.

The address translation generation module 430 adds the determined offset to the physical address of the second virtual machine to determine a host virtual address associated with the physical address of the second virtual machine and stores in the translation table the physical address of the second virtual machine and the host virtual address.

Translation module 460 processes request to access physical device 440 by the second virtual machine. Initially, any request to access physical device 440 by the second virtual machine is managed by the first virtual machine prior to reaching the hypervisor. Upon receiving a request to access physical device 440, the translation module 460 determines whether the second virtual machine is using a guest physical address as a virtual address for the physical device. Upon determining that the second virtual machine is using a guest physical address as the virtual address for the physical device, the translation module 460 accesses the translation table stored in storage 450 and translates the guest physical address of the second virtual machine to a host virtual address to access the physical device.

FIG. 5 depicts a flow diagram of one illustrative example of a method 500 for virtual device translation for accessing a virtual device by nested virtual machines, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 500 may be performed by processing devices of a server device or a client device and may begin at block 510. At block 510, the processing device runs, by a host computer system, a hypervisor managing a first virtual machine.

At block 520, responsive to receiving, by the hypervisor, a request to create a second virtual machine nested within the first virtual machine, the processing device initializes a first data structure for address translation of physical addresses of the second virtual machine corresponding to virtual addresses of a peripheral device. As described previously, the first virtual machine sends a request to the hypervisor to create the second virtual machine (e.g., a nested virtual machine) which creates the second virtual machine within the first machine. The first virtual machine provides the second virtual machine guest memory (e.g., a portion of guest memory from the first virtual machine). The first virtual machine while sending the request sends a notification to the hypervisor to inform the hypervisor that the second virtual machine will be using the exposed guest memory (e.g., physical address of the second virtual machine) as a virtual address for accessing the peripheral device (e.g., a physical device). As described previously, the notification may be based on the presence of a virtual input/output memory management unit (IOMMU) in the second virtual machine or the configuration of the virtual IOMMU by the second virtual machine. The peripheral device may be, for example, a network interface controller. The first data structure (e.g., translation table) stores mapping between the physical addresses of the second virtual machine associated with virtual addresses corresponding to the peripheral device to host virtual addresses.

At block 530, the processing device receives an identity of the peripheral device associated with the second virtual machine and at least one guest memory address allocated to the second virtual machine. Each guest memory address of the at least one guest memory address allocated to the second virtual machine corresponds to a physical address of the first virtual machine and a physical address of the second virtual machine. As described previously, each guest memory address includes a guest physical address of the first virtual machine and a guest physical address of the second virtual machine based on the allocation (e.g., exposure) of the guest memory addresses from the first virtual machine to the second virtual machine. Accordingly, the processing device obtains a physical address of the first virtual machine associated with the physical address of the second virtual machine.

At block 540, the processing device receives, by the peripheral device, a request from the second virtual machine. Upon receiving the request from the second virtual machine, the processing device determines, by the first virtual machine, access to the device by the second virtual machine. As described previously, the request from the second virtual machine is first received by the first virtual machine to determine access privileges, for example, validation and execution of the request.

At block 550, the processing device determines whether a physical address referenced by the request corresponds to a virtual address of the peripheral device. At block 560, responsive to determining that the physical address referenced by the request corresponds to the virtual address of the peripheral device, the processing device determines, based on the at least one guest memory address associated with the physical address referenced by the request, a host virtual address corresponding to the physical address of the second virtual machine.

To determine, based on the at least one guest memory address associated with the physical address of the second virtual machine, the host virtual address corresponding to the physical address of the physical addresses of the second virtual machine, the processing device obtains the physical address of the first virtual machine. As previously described, the guest physical address of the second virtual machine may be translated to the corresponding guest physical address of the first virtual machine using a guest page table that is managed by the hypervisor of the first virtual machine and exposed to the hypervisor.

Based on the obtained physical address of the first virtual machine, the process device determines a host physical address. As previously described, mappings of guest physical addresses of the first virtual machine to corresponding host physical addresses may be stored in a memory data structure, such as an extended page table (EPT). Accordingly, the guest physical address of the first virtual machine may be translated to the corresponding host physical address using the EPT that is managed by the hypervisor.

The processing device may determine an offset associated with the determined host physical address. As described previously, host physical address spaces of a memory buffer (e.g., a physical memory storage) and host virtual address spaces of the memory buffer are allocated by the hypervisor. Thus, each of the host physical address spaces and the host virtual address spaces contain a starting address on the memory buffer. The offset is determined based on the difference between the starting address on the memory buffer associated with the host physical address space and the starting address on the memory buffer associated with the host virtual address. The offset may be a specific memory size that covers the virtual addresses used by hypervisor 210. For example, the offset may be selected to avoid overlapping with virtual addresses used by hypervisor 210, such as addresses up to 512 Mbytes. Thus, the offset, for example, will be 512 Mbytes to avoid the addresses up to 512 Mbytes used by the hypervisor 210. Accordingly, when the offset is added to a physical address of the, the location of the physical address will not overlap with the physical address being used by the hypervisor. Responsive to determining the offset associated with the determined host physical address, the processing device determines the host virtual address. As described previously, the host virtual address is determined by adding the determined offset to the physical address of the second virtual machine. Accordingly, both the physical address of the second virtual machine and the host virtual address associated with the physical address of the second virtual machine are stored in the first data structure (e.g., translation table).

Responsive to completing the operations described herein above with references to block 560, the method may terminate.

Figure 6:
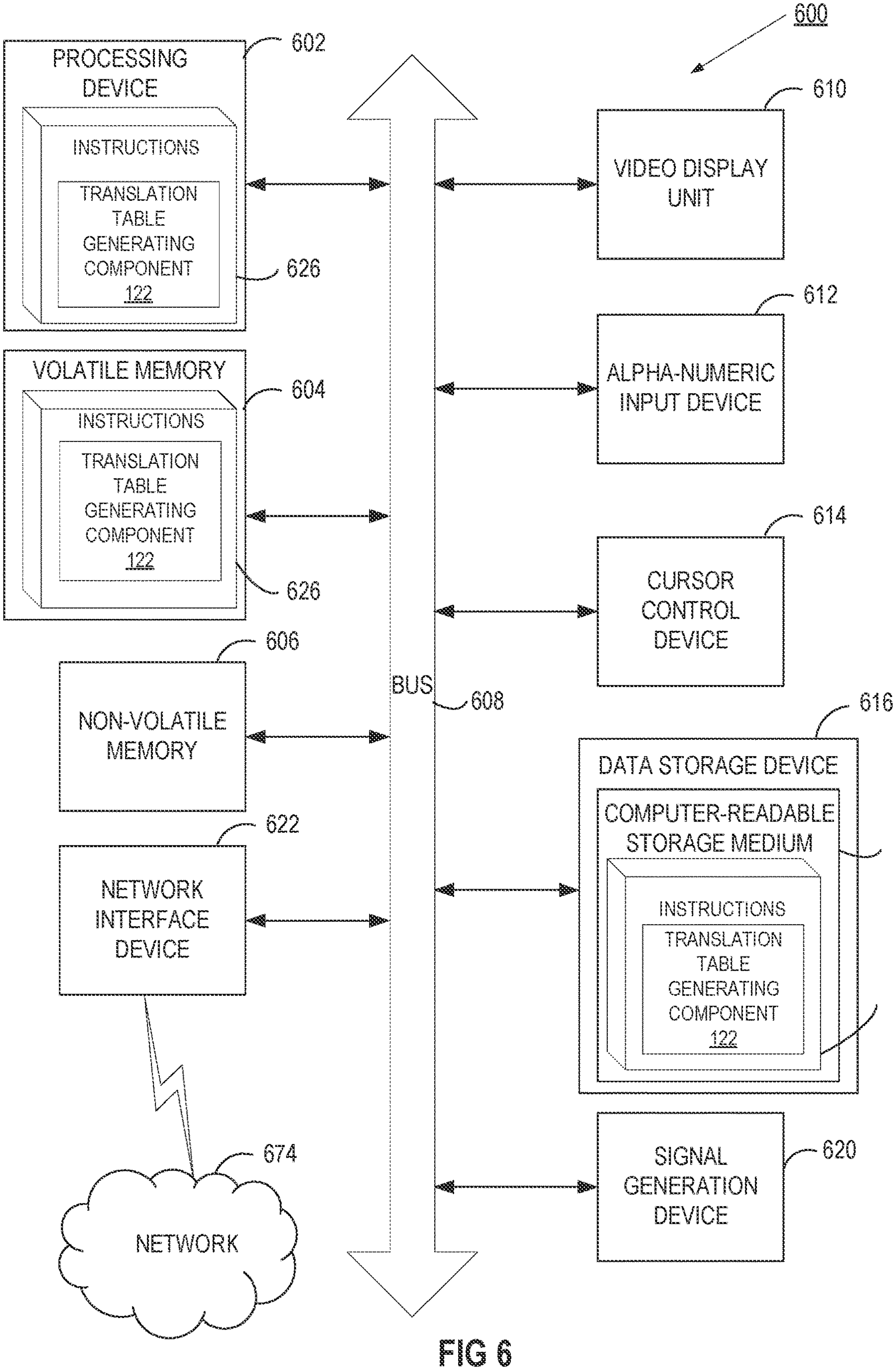
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 700 may correspond to computing device 100 of FIG. 1, computer system 200 of FIG. 5, or computer system 400 of FIG. 4. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term “computer” shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for table generating component 122, and modules illustrated in FIGS. 1, 2, and 4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 or 600 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

running, by a host computer system, a hypervisor managing a first virtual machine;

receiving, by the hypervisor, a request to create a second virtual machine nested within the first virtual machine;

determining whether the request to create the second virtual machine includes a request to use a physical address as a virtual address for a peripheral device;

initializing a first data structure for address translation of the physical addresses of the second virtual machine corresponding to virtual addresses of the peripheral device to host virtual addresses when the request to create the second virtual machine includes the request to use the physical address as the virtual address for the peripheral device, wherein the first data structure includes an offset based on a difference between a first starting address on a memory buffer associated with a host physical address and a second starting address on the memory buffer associated with a host virtual address that is based on adding the offset to a guest physical address of the first virtual machine;

receiving, by the peripheral device, a request from the second virtual machine;

determining, by a processing device of the host computer system, whether the physical address referenced by the request corresponds to the virtual address of the peripheral device; and responsive to determining that the physical address referenced by the request corresponds to the virtual address of the peripheral device, using the first data structure for address translation of the physical address referenced by the request to the host virtual address.

2. The method of claim 1, wherein mapping the physical address of the second virtual machine to the host virtual address includes obtaining the physical address of the first virtual machine associated with the physical address of the second virtual machine and determining, based on the physical address of the first virtual machine, the host physical address, determining the offset associated with the determined host physical address, and determining, based on the offset and the physical address of the second virtual machine, the host virtual address associated with the physical address of the second virtual machine.

3. The method of claim 2, wherein obtaining the physical address of the first virtual machine associated with the physical address of the second virtual machine includes translating the physical address of the second virtual machine to the physical address of the first virtual machine using a guest page table exposed to the hypervisor by the first virtual machine.

4. The method of claim 2, wherein determining, based on the physical address of the first virtual machine, the host physical address includes translating the physical address of the first virtual machine to the host physical address using a page table managed by the hypervisor.

5. The method of claim 2, wherein determining, based on the offset and the physical address of the second virtual machine, the host virtual address associated with the physical address of the second virtual machine includes adding the offset to the physical address of the second virtual machine to determining the host virtual address associated with the physical address of the second virtual machine.

6. The method of claim 1, wherein receiving, by the peripheral device, the request from the second virtual machine includes receiving, by the first virtual machine, the request to access the peripheral device by the second virtual machine and sending the request to access the peripheral device to the hypervisor based on validation of access privileges of the second virtual machine to access the peripheral device.

7. The method of claim 1, wherein determining that the second virtual machine requested to use the physical address as the virtual address for the peripheral device includes one of: identifying the presence of a virtual input/output memory management unit (IOMMU) in the second virtual machine or identifying a configuration of the virtual IOMMU by the second virtual machine.

8. A system comprising:

a memory device; and a processing device, operatively coupled with the memory device, to:

run, by a host computer system, a hypervisor managing a first virtual machine;

receive, by the hypervisor, a request to create a second virtual machine nested within the first virtual machine;

determine whether the request to create the second virtual machine includes a request to use a physical address as a virtual address for a peripheral device; and initialize a first data structure for address translation of the physical addresses of the second virtual machine corresponding to virtual addresses of the peripheral device to host virtual addresses when the request to create the second virtual machine includes the request to use the physical address as the virtual address for the peripheral device, wherein the first data structure includes an offset based on a difference between a first starting address on a memory buffer associated with a host physical address and a second starting address on the memory buffer associated with a host virtual address that is based on an addition of the offset to a guest physical address of the first virtual machine, receive, by the peripheral device, a request from the second virtual machine;

determine, by a processing device of the host computer system, whether the physical address referenced by the request corresponds to the virtual address of the peripheral device; and responsive to determining that the physical address referenced by the request corresponds to the virtual address of the peripheral device, using the first data structure for address translation of the physical address referenced by the request to the host virtual address.

9. The system of claim 8, wherein the processing device is to map the physical address of the second virtual machine to the host virtual address includes:

obtain the physical address of the first virtual machine associated with the physical address of the second virtual machine and determine, based on the physical address of the first virtual machine, the host physical address;

determine the offset associated with the determined host physical address; and determine, based on the offset and the physical address of the second virtual machine, the host virtual address associated with the physical address of the second virtual machine.

10. The system of claim 9, wherein to obtain the physical address of the first virtual machine associated with the physical address of the second virtual machine the processing device is to translate the physical address of the second virtual machine to the physical address of the first virtual machine using a guest page table exposed to the hypervisor by the first virtual machine.

11. The system of claim 9, wherein to determine, based on the physical address of the first virtual machine, the host physical address the processing device is to translate the physical address of the first virtual machine to the host physical address using a page table managed by the hypervisor.

12. The system of claim 9, wherein to determine, based on the offset and the physical address of the second virtual machine, the host virtual address associated with the physical address of the second virtual machine the processing device is to add the offset to the physical address of the second virtual machine to determining the host virtual address associated with the physical address of the second virtual machine.

13. The system of claim 8, wherein to receive, by the peripheral device, the request from the second virtual machine the processing device is to receive, by the first virtual machine, the request to access the peripheral device by the second virtual machine and send the request to access the peripheral device to the hypervisor based on validation of access privileges of the second virtual machine to access the peripheral device.

14. The system of claim 8, wherein to determine that the second virtual machine requested to use the physical address as the virtual address for the peripheral device the processing device is to: identify the presence of a virtual input/output memory management unit (IOMMU) in the second virtual machine or identify a configuration of the virtual IOMMU by the second virtual machine.

15. A non-transitory computer-readable storage medium comprising instructions that, when executed by a processing device, cause the processing device to:

run, by a host computer system, a hypervisor managing a first virtual machine;

responsive to receipt of, by the hypervisor, a request to create a second virtual machine nested within the first virtual machine, initialize a first data structure for address translation of physical addresses of the second virtual machine corresponding to virtual addresses of a peripheral device, wherein the first data structure includes an offset based on a difference between a first starting address on a memory buffer associated with a host physical address and a second starting address on the memory buffer associated with a host virtual address that is based on an addition of the offset to a guest physical address of the first virtual machine;

receive an identity of the peripheral device associated with the second virtual machine and at least one guest memory address allocated to the second virtual machine;

receive, by the peripheral device, a request from the second virtual machine;

determine whether a physical address referenced by the request corresponds to a virtual address of the peripheral device; and responsive to a determination that the physical address referenced by the request corresponds to the virtual address of the peripheral device, determine, by the processing device, based on the at least one guest memory address associated with the physical address referenced by the request, the host virtual address corresponding to the physical address of the second virtual machine, wherein the first data structure is utilized for address translation of the physical address referenced by the request to the host virtual address.

16. The non-transitory computer-readable storage medium according to claim 15, wherein to receive the request from the second virtual machine the processing device is to receive, by the first virtual machine, the request to access the peripheral device by the second virtual machine and send the request to access the peripheral device to the hypervisor based on validation of access privileges of the second virtual machine to access the peripheral device.

17. The non-transitory computer-readable storage medium according to claim 15, wherein each guest memory address of the at least one guest memory address allocated to the second virtual machine corresponds to a first physical address of the first virtual machine and a second physical address of the second virtual machine.

18. The non-transitory computer-readable storage medium according to claim 17, wherein the processing device is to:

determine, based on the at least one guest memory address associated with the physical address of the second virtual machine, the host virtual address corresponding to the physical address of the physical addresses of the second virtual machine to obtain the physical address of the first virtual machine;

determine, based on the physical address of the first virtual machine, the host physical address;

determine the offset associated with the determined host physical address; and determine, based on the offset and the physical address of the second virtual machine, the host virtual address.

19. The non-transitory computer-readable storage medium according to claim 15, wherein the processing device is to map the physical address of the second virtual machine to the host virtual address includes:

obtain the physical address of the first virtual machine associated with the physical address of the second virtual machine and determine, based on the physical address of the first virtual machine, the host physical address;

determine the offset associated with the determined host physical address; and determine, based on the offset and the physical address of the second virtual machine, the host virtual address associated with the physical address of the second virtual machine.

20. The non-transitory computer-readable storage medium according to claim 15, wherein to determine that the second virtual machine requested to use the physical address as the virtual address for the peripheral device the processing device is to: identify the presence of a virtual input/output memory management unit (IOMMU) in the second virtual machine or identify a configuration of the virtual IOMMU by the second virtual machine.

* * * * *